Figure 1:
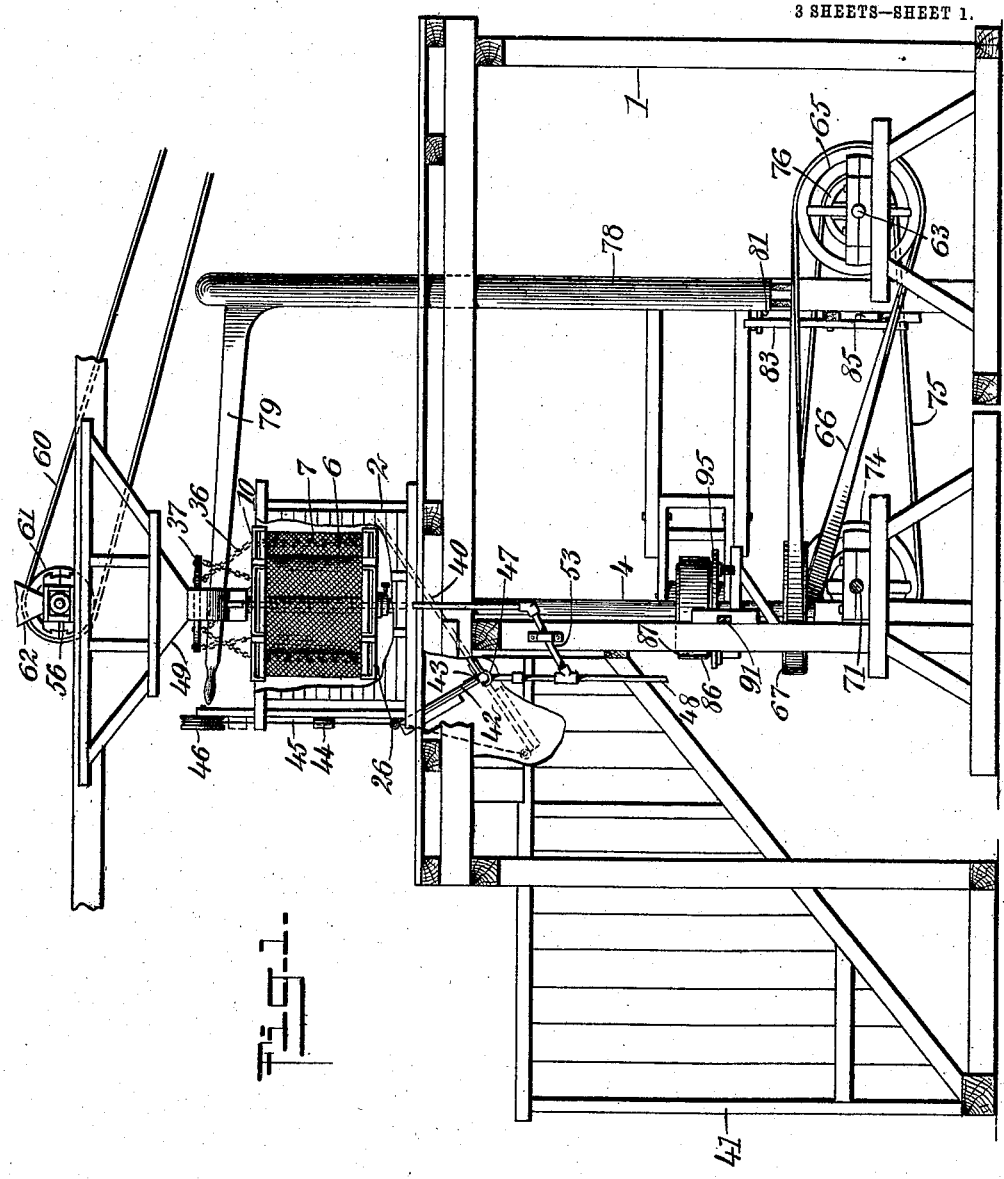

No. 867,800. PATENTED OCT. 8, 1907.
R. F. CORDERO.
CENTRIFUGAL SEPARATOR.
APPLICATION FILED JULY 16, 1906.

3 SHEETS—SHEET 1.

WITNESSES
INVENTOR
Ramon F. Cordero
BY
ATTORNEYS

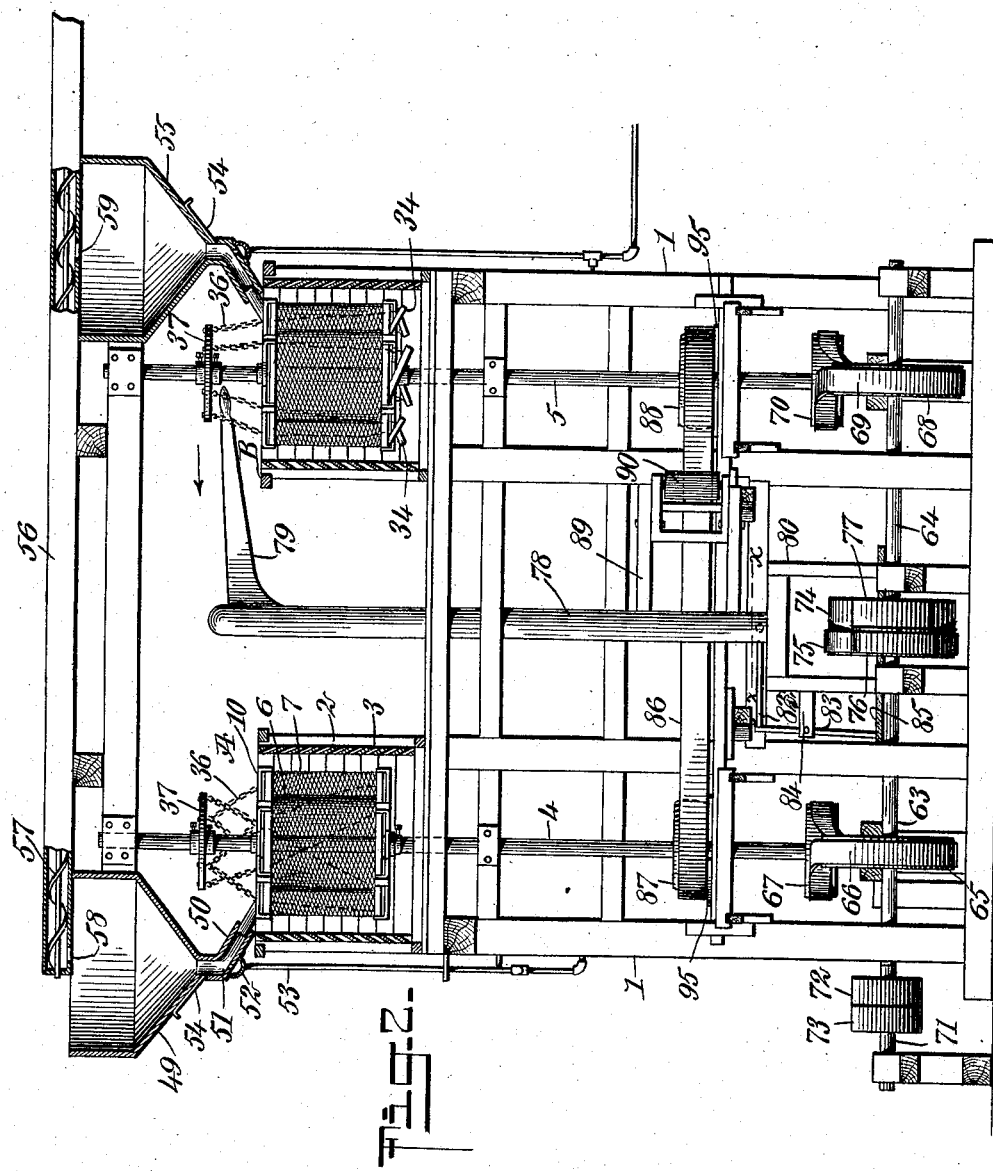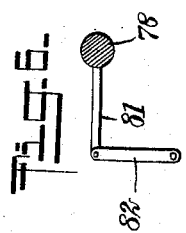

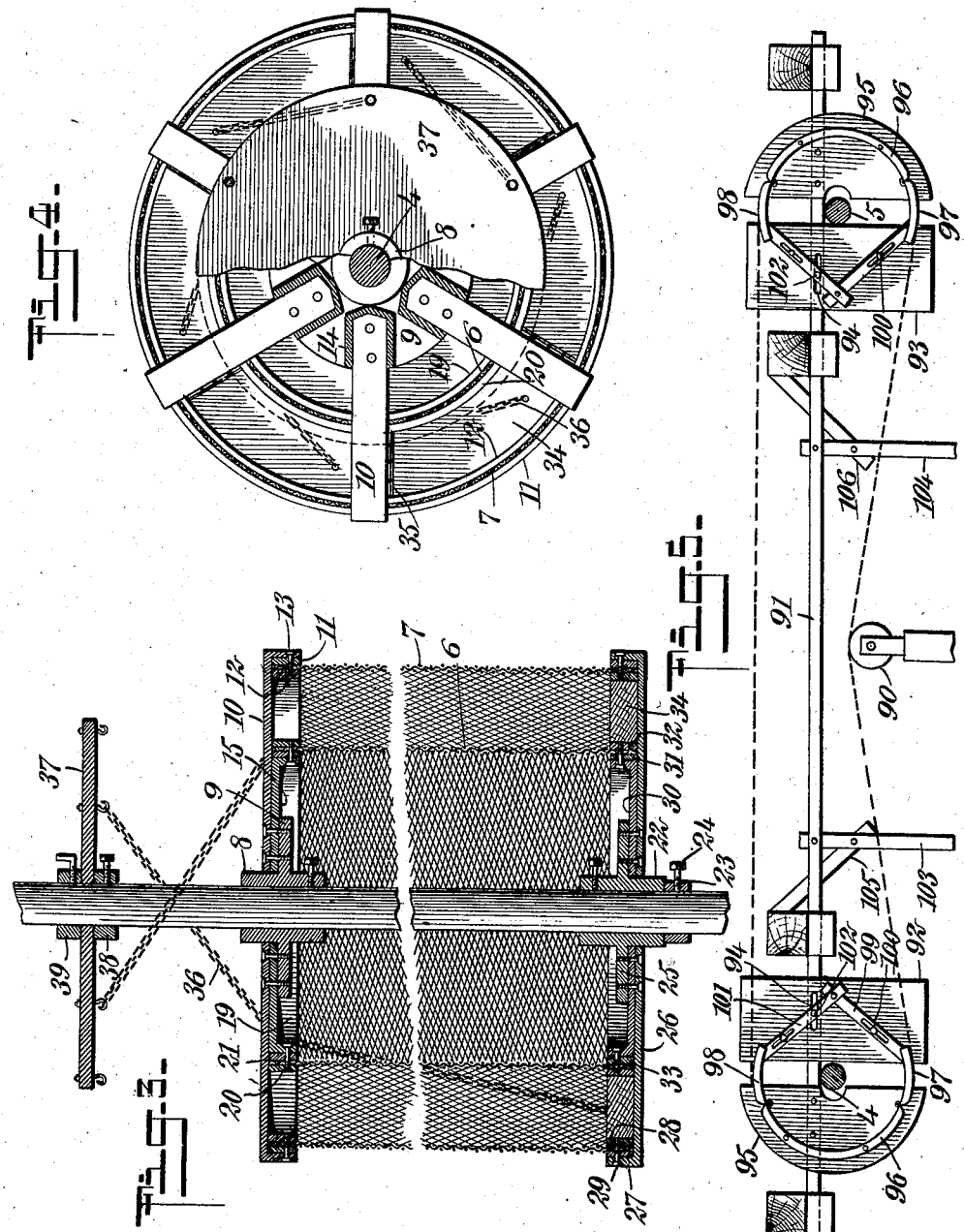

UNITED STATES PATENT OFFICE.

RAMÓN F. CORDERO, OF RUBIO-TACHIRA, VENEZUELA.

CENTRIFUGAL SEPARATOR.

No. 867,800.            Specification of Letters Patent.            Patented Oct. 8, 1907.

Application filed July 16, 1906. Serial No. 326,357.

*To all whom it may concern:*

Be it known that I, RAMÓN F. CORDERO, a citizen of the Republic of Venezuela, and a resident of Rubio-Tachira, Venezuela, have invented a new and Improved Centrifugal Separator, of which the following is a full, clear, and exact description.

This invention relates particularly to improvements in centrifugals for separating moisture from coffee beans, although it may be employed for separating other matter. The object is to provide a centrifugal that will be simple in construction, and by means of which, separation may be rapidly and thoroughly carried on.

Other objects of the invention will appear in the general description.

I will describe a centrifugal separator embodying my invention and then point out the novel features in the appended claims.

Reference is to be had to the accompanying drawings forming a part of this specification, in which similar characters of reference indicate corresponding parts in all the figures.

Figure 1 is a side elevation of a separator embodying my invention; Fig. 2 is a rear elevation thereof, partly in section; Fig. 3 is a sectional elevation of one of the centrifugal gages; Fig. 4 is a top view thereof; Fig. 5 is a diagrammatic plan of a driving mechanism that may be employed for operating two centrifugals from one shaft; and Fig. 6 is a detail section on the line $x$—$x$ of Fig. 2.

Referring to the drawings, 1 designates the frame of the machine in which are mounted, as here shown, two centrifugals A, B; it may be here stated that it is the intention to operate one centrifugal while the other is idle, to discharge the coffee therefrom; but means is provided, as will hereinafter appear, for operating the two centrifugals together.

As the centrifugals are of like construction a description of one will answer for both. The centrifugals are mounted in boxings 2, the walls of which have openings 3 for the outlet of air, as will be hereinafter described.

The centrifugal A, is mounted on a vertical shaft 4, while the centrifugal B is mounted on a vertical shaft 5; each centrifugal consists of inner casings 6, such as wire-netting, and an outer casing 7, also consisting of wire-netting. The space between the casings 6 and 7 is designed to receive the coffee or similar material to be treated. Each centrifugal is connected to its shaft at the upper portion, by means of a collar 8 secured to the shaft by means of a set-screw, the said collar being attached to a ring 9 or rather, formed integral therewith; and extending outward from this ring are arms 10, the outer ends of which are turned downward to engage the outer surface of the ring 11 engaging around the upper portion of the casing 7. This ring 11, with an inner ring 12, forms clamping means for the upper portion of said casing, the parts being held together by means of screws or bolts 13.

The inner ends of the arms 10 are seated in sockets 14 in which are also seated arms 15 which extend outward and engage against the inner side of the inner ring 19 which presses against the inner side of the casing 6 at the upper end, and forms one member of a clamp; the other member consisting of the outer ring 20, the rings being held by screws 21 which pass through said rings and through the downwardly extended portions of the arms 15. The lower portion of each centrifugal is similarly connected to the shaft; that is, secured to the shaft by means of a set screw is a sleeve 22 which may rest upon a collar 23 surrounding the shaft and held by a set screw 24, and on this sleeve is a flange or ring 25, from the sockets of which arms 26 extend outward and have upwardly extended portions engaging with the outer, bottom ring 27 which, with the inner ring 28, forms the stiffening or clamping device for the lower portion of the casing, the parts being held together by means of screws 29.

From the flange or ring 25 arms 30 extend outward and have upwardly turned portions for engaging against the inner clamping ring 31 for the inner casing 6, the outer surface of said inner casing being engaged with a clamping ring 32, the clamping rings being held together by screws 33 which pass through the said upwardly-turned ends of the arms 30.

As before stated, the coffee or other material to be treated is within the space between the casings 6 and 7, and this space, when a centrifugal is in operation, obviously, must be closed, but in such manner that it may be opened for the discharge of material.

The bottom closures consist of a plurality of segmental, vertical swinging doors 34, hinged as indicated at 35. From each door, a chain 36 extends upward and connects with a plate 37 mounted somewhat loosely on the centrifugal shaft, by means of a lower collar 38 and an upper collar 39, held in place by suitable bolts and set screws. By regulating these collars upward and downward on the shaft, and securing them by the said bolts and set screws, the degree of opening of the doors may be regulated. When the doors are closed it will be noted, as in Fig. 3 and at the left-hand side of Fig. 2, that the chains cross the shaft; and while the centrifugal is in motion they will maintain this position to hold the doors closed. Upon the stopping of a centrifugal, the plate 37 will rotate in a direction to bring the chains in substantially straight line as indicated at the right-hand side of Fig. 2, thus permitting coffee to pass out onto a chute 40 from which the same discharges into a bin 41.

At the lower portion of the chute 40 is an upwardly swinging member 42, this member 42 being secured by means of hinges 43, and when the machine is in operation the said section 42 will be held upward by means of a weight 44 connected to a line 45 which passes over a pulley 46 and connects with said section 42, and thus a slight space will be provided between the adjacent edges of the parts 42 and 40 to permit water to discharge into a trough 47 and this water is carried away through a drain pipe 48.

Arranged above the centrifugal A is a receiving hopper 49 having at its lower end a spout 50 for discharging material into the centrifugal, which spout 50 has a downwardly inclined portion provided with a perforation 51 for the discharge of water into a trough 52 from which a discharge pipe 53 leads to the pipe 48; and movable through the discharge or outlet 50 is a cut-off valve 54.

Over the centrifugal B is a hopper 55 similar to that just described and having similar discharge and drain connections, and arranged over these hoppers 49, 55, is a tube 56 through which the coffee is fed by a screw conveyer 57 operating in the tube, and the material discharges into the hopper 49 through an opening 58 in the tube, and the material may discharge into the hopper 55 through an opening 59 in the tube. The shaft of the screw conveyer is operated by any suitable means; I have here indicated a driving belt 60 as engaging with a wheel 61 on said shaft, and coffee or other material is fed to the tube through a hopper 62.

The centrifugal A is driven from a shaft 63 arranged at the rear portion of the machine frame, and the centrifugal B is operated from a shaft 64 also arranged at the rear portion of the machine frame. On the shaft 63 is a band-wheel 65 from which a band 66 extends to a pulley 67 on the shaft 4. On the shaft 64 is a band-wheel 68 from which the band 69 extends to the pulley 70 on the shaft 5. Supported in the frame forward of said shafts is a driving shaft 71 having thereon a fast pulley 72 and a loose pulley 73, and on this driving shaft is a band-wheel 74, the band 75 of which is designed to be shifted into engagement with the pulley 76 on the inner end of the shaft 63 or with the pulley 77 on the inner end of the counter shaft 64, this of course, depending upon which centrifugal is to be operated. It will be observed that the band wheel 74 has a surface width approximating that of the width of the band pulleys 76 and 77 so that when the shaft is shifted from one pulley to the other, the band will remain on the wheel 74.

I will now describe a means for shifting the belt. This means comprises a vertically-extending shifting-shaft 78, having an operating lever 79 at its upper end and extended forward. The lower end of the shifting shaft 78 has a bearing in a frame 80, and extended outward from the shaft, above the frame, is an arm 81, having a link connection 82 with a vertically disposed rod 83 fulcrumed to an arm 84 on the frame 80. The lower end of this rod 83 connects with a longitudinal sliding bar 85, which has fingers for engaging with the opposite sides of a band, as is usual in such shifting devices.

I will now describe means whereby both centrifugals may be operated together from one driving shaft, the said means comprising a belt 86, designed for driving connection with a pulley 87 on the shaft 4, and a pulley 88 on the shaft 5. When the centrifugals are not driven together, the said belt 86 is to be dropped downward to disengage it from frictional engagement with the pulleys 87, 88, thus reducing the power required to drive one centrifugal as compared with the power that may be required for driving both. It will be noted that the pulleys 87 and 88 are transversely rounded so that when the belt is tightened, as will be hereinafter described, the belt will feed upward on said pulleys. The belt is tightened by movements of the shifting shaft 78. As here shown, attached to said shaft is a frame 89, carrying a roller 90 designed to engage with the belt, and arranged to slide horizontally underneath the pulleys is a shifting bar 91 which slides in suitable bearings in the machine frame, and underneath the fixed plates 92, 93, the said plates being slotted as indicated at 94. The plate 92 it will be noted is arranged at the inner side of the shaft 4 while the plate 93 is arranged at the inner side of the shaft 5.

Rigidly connected to the shifting or sliding bar 91 are plates 95 on which are upwardly extended segmental flanges 96 which terminate at the ends in hinged sections 97, 98. Pivotally connected to the segment members 97 is a link 99, which is longitudinally slotted to receive a pin 100 extended from the fixed plate, and the links 99 have pivotal connection with links 101, the said links 101 at the outer ends being pivoted to the sections 98; these links 101 are fulcrumed on pins 102 extended upward from the shifting rod 91 through the slots 94. By this arrangement it is obvious that when the rod 91 is moved in one direction, the segment members 97, 98 at one end will be spread to engage with the belt; that is, dropped downward thereon, while the others will be moved inward to normal position, releasing the tension of the belt around the segment 96. The shifting of the rod 91 is done through the agency of the shaft 78 operating against the arms 103, 104. The arm 104 is mounted to swing on a bracket 105 and the said arm is pivotally connected to the shifting rod 91. The arm 104 is similarly mounted on a support 106 and is pivoted to said shifting bar 91. Obviously, when the shaft 78 is rotated in one direction, a portion of the frame carried thereby may engage with the arm 103, shifting the rod 91 in one direction; and when the said frame is turned to engage against the arm 104, the rod will be moved in the opposite direction. When the two centrifugals are to be operated together, the roller 90 is to be moved to a central position, thus tightening the belt as indicated in Fig. 5, and then the belt, as before stated, will move upward onto the pulleys 87 and 88.

In the operation, assuming the centrifugal A to be in operation and the centrifugal B idle, the coffee will discharge from the tube 56 into the hopper 49, and a portion of the water or heavy moisture that may be therein will discharge into the trough 52, the coffee will pass into the space between the parts 6 and 7, and the moisture remaining therein will, by the centrifugal action, be forced outward through the screen casing 7; and this separation of the moisture from the coffee will be greatly accelerated by the air drawn in through the inner casing 6, such air passing through—or rather between—the coffee grounds and out through the openings 3. When the coffee in A shall have been sufficiently treated, the said centrifugal is stopped by shifting the belt 75 to the pulley on the shaft 64 in the centrifugal in which there is of course, no coffee, as the supply thereto is cut off by the valve 54. When the said centrifugal B is in movement, the doors 34 will be automatically closed and then the coffee may be admitted. As the centrifugal A comes to rest, the plate 37 will move sufficiently thereon to permit the chains 36 to straighten so that the coffee may discharge. When both centrifugals are to be operated at the same time, and from one main shaft, the shaft 78 is to be rotated to tighten the belt as before described, so that it will ascend to engage the pulleys 87 and 88. As before stated, the moisture discharged from a centrifugal will flow into the trough 47 and thence out through the pipe 48. Of course, when coffee is to be discharged from the centrifugal the section 42 of the chute is to be lowered as indicated in dotted lines in Fig. 1.

Having thus described my invention I claim as new, and desire to secure by Letters Patent:

1. In a centrifugal separator, two perforated casings arranged one within the other and spaced apart to form a chamber between the same, for the material to be treated, means for rotating the said casings, swinging doors for forming the bottom of said spaces, and means for closing said doors by the rotation of the casings.
2. A centrifugal separator, comprising two perforated casings arranged one inward of the other, and spaced apart to form a chamber between them, a shaft upon which the casings are mounted, segmental doors at the bottom of said spaces, a plate mounted to turn loosely on the shaft above said casings, and flexible connections between said plate and said doors.

3. In a centrifugal separator, a vertical shaft, a centrifugal on the shaft, consisting of inner and outer perforated casings spaced apart, means for feeding material to the space between the casings, swinging doors at the lower portion of said space, and means for raising and lowering said doors, the said means being actuated to raise said doors by the rotary movement of the separator.

4. In a separator, a centrifugal, vertical swinging bottom closures for the centrifugal, and means actuated by the rotation of the centrifugal for moving said closures to closed position.

5. A centrifugal separator, comprising two perforated casings arranged one within the other and spaced apart to form a chamber between the same, a shaft upon which the casings are mounted, a plurality of segmental hinged doors at the bottom of said chamber, collars adjustably held on said shaft above said casings, a plate mounted to turn loosely on said shaft between the collars, and chains connecting said doors with said plate, the said chains crossing the shaft when the centrifugal is in motion and holding the doors closed.

6. In a centrifugal separator two casings arranged one within the other and spaced apart to form a chamber between the same, a shaft mounted to turn and to which the casings are secured, a plurality of swinging bottom doors for said chamber, a plate adjustable vertically on the shaft and mounted to turn loosely thereon, means for holding the plate in the adjusted position, and flexible connections between said doors and said plate, and extending upward through said chamber, whereby when the centrifugal is in motion the said connections will cross the shaft and hold the doors closed and when the centrifugal stops the connections will be brought into substantially straight lines to permit the doors to open.

7. In a centrifugal separator, two perforated or reticulated casings arranged one within the other and spaced apart to form a chamber between the same for the material to be treated, the said casings being provided at their ends with clamping rings, a shaft, collars secured to the shaft, flanges connected with the collars, and arms extending outward from the flanges and secured to the clamping rings at the ends of the said casings.

8. In a centrifugal separator, two casings arranged one within the other and spaced apart to form a chamber between them, the casings being provided at their ends with inner and outer clamping rings, a shaft, collars secured to the shaft, flanges connected with the collars, arms secured in sockets in the flanges and extending outward from the flanges, the arms having angular outer ends engaging the outer surface of the outer clamping rings at the ends of the outer casing, shorter arms extending outward from the sockets of said flanges, and having angular ends engaging the inner sides of the inner clamping rings at the ends of the inner casing, and means for securing the said arms to said clamping rings.

In testimony whereof I have signed my name to this specification in the presence of two subscribing witnesses.

RAMÓN F. CORDERO.

Witnesses:
  JNO. M. RITTER,
  C. R. FERGUSON.